Figure 1:
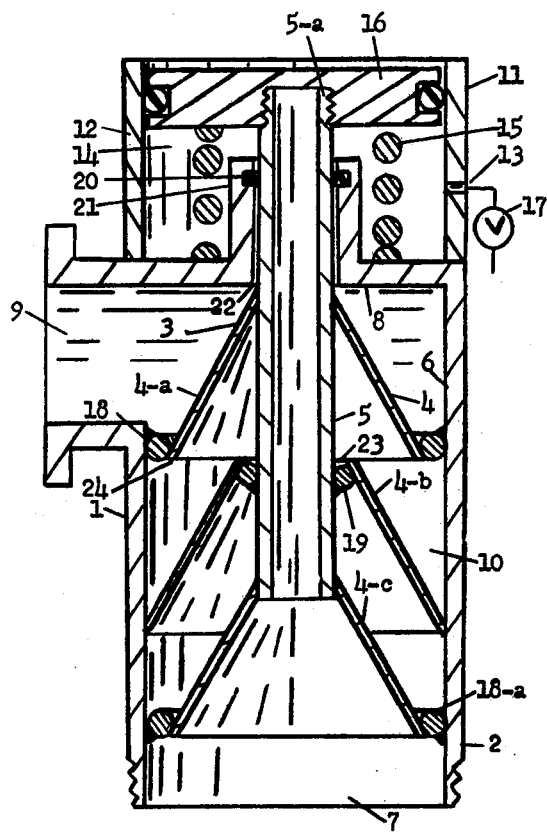

United States Patent [19]

Pauliukonis

[11] 4,270,571
[45] Jun. 2, 1981

[54] HIGH PRESSURE LETDOWN VALVE

[76] Inventor: Richard S. Pauliukonis, 6660 Greenbriar Dr., Cleveland, Ohio 44130

[21] Appl. No.: 55,470

[22] Filed: Jul. 6, 1979

[51] Int. Cl.³ .............................................. F16K 47/04
[52] U.S. Cl. ................................ 137/614.11; 251/127; 137/614.19
[58] Field of Search ................ 138/42, 43; 137/614.11, 137/614.18, 614.19; 251/127

[56] References Cited

U.S. PATENT DOCUMENTS

| 1,896,833 | 2/1933 | Bramsen et al. | 251/127 |
| 2,073,553 | 3/1937 | Dienst | 137/614.11 |
| 3,152,617 | 10/1964 | Justus et al. | 138/43 |
| 3,542,332 | 11/1970 | Chevalier | 251/63.6 |
| 3,880,399 | 4/1975 | Luthe | 251/127 |
| 4,078,582 | 3/1978 | Hetz | 251/127 |
| 4,162,784 | 7/1979 | Legille et al. | 251/127 |

FOREIGN PATENT DOCUMENTS 2803485 9/1978 Fed. Rep. of Germany ........... 251/127

Primary Examiner—Martin P. Schwadron
Assistant Examiner—A. Michael Chambers
Attorney, Agent, or Firm—Richard S. Pauliukonis

[57] ABSTRACT

A throttle valve for high pressure letdown includes an elongated valve housing with pressure reducing valve section which contains a plurality of conical baffles spaced therein along the length thereof stretching between a high pressure fluid supply port entering said valve housing through housing wall perpendicularly and an axially disposed fluid exhaust port for low pressure discharge of the fluid subjected to torture pathway accompanied by multitude flow reversals with only limited fluid expansion and contraction processes induced thereto forcing fluid expansion when it passes large diameter edge of one baffle first before it is forced to contract immediately thereafter when passing small diameter orifice of another baffle spaced a short distance away until all baffles along the way are crossed extracting huge energy amount from high pressure fluid to result in a low pressure fluid exhaust from the valve, including means for flow and pressure drop modulation by varying position of baffles relative to net free area allowable for fluid flow through the valve.

6 Claims, 3 Drawing Figures

U.S. Patent

Jun. 2, 1981

4,270,571

4,270,571

HIGH PRESSURE LETDOWN VALVE

This invention relates to high pressure valves handling large fluid volumes generally and to pressure letdown valves capable of large pressure drop specifically. In particular, this invention is useful in coal gasification and other energy related processes requiring up to 2000 psi pressure drops in single fluid path through the valve.

Since there is no prior art designs that could handle large fluid flows with high pressure drops in a single path through such valves, except for few very complicated and costly valves with torture pathways, this invention will fill the gap of products industry is seeking for use with urgent developments in energy field, including other applications in chemical and process industries.

It is obviously desirable to provide valves of this type which are simple in design, relatively inexpensive and reliable in operation of costly conversion processes. Is is also desirable that such valves cause maximum pressure drop to the incoming high pressure fluid in order to ascertain maximum extraction of pressure energy before fluid is allowed to exhaust therefrom for subsequent lower pressure conversion processes without danger.

The present invention provides valves of this general type which are simple in design, control in operation and hence low in cost. One aspect of the invention makes possible a significant increase in the amount of pressure drop that occurs in the transmission of pressurized fluid through the valve proper provided with multiple resistances such as flow reversals with fluid expansion and contraction processes.

These and other objects and advantages of the invention will become more fully apparent from the following description of the embodiment of the invention taken together with the accompanying drawings.

IN THE DRAWINGS

FIG. 1 is a cross-section of pressure letdown valve shown in valve closed position.

Figure 2:
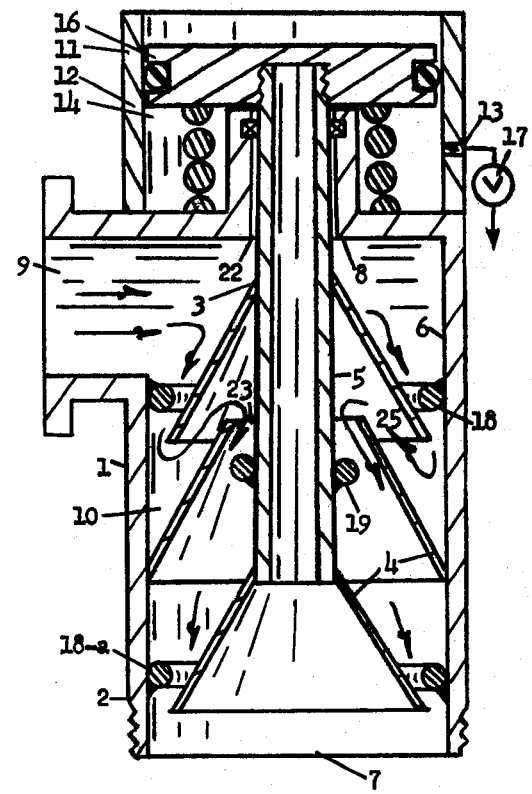

FIG. 2 identifies the valve of FIG. 1 in open position.

Figure 3:
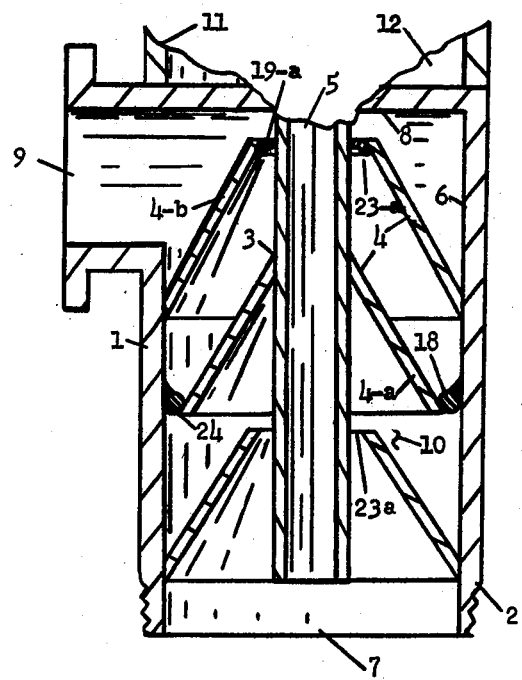

FIG. 3 is a valve of FIG. 1 with modified arrangement of conical baffles.

Shown in FIGS. 1, 2 and 3 is an elongated valve 1 with housing 2 containing pressure reducing valving assembly 3 provided with a plurality of conical baffles 4 spaced along the length of a central tubular member 5 stretching between high pressure fluid supply port 9 and low pressure fluid exhaust port 7 inside housing bore 6 which is provided with a closed bore end 8 adjacent which port 9 enters bore 6 perpendicularly through a side wall, comprising together with bore 6 a pressure reducing valve section 10 atop of which a housing extension 11 is secured so as to serve as valve operating section 12, provided with vent 13 of cavity 14 housing spring 15 under piston 16 which is secured to central tubular member 5 in a concentric coaxial relationship with valving assembly 3 of pressure reducing section 10 for interconnected operable relationship between valve operating and pressure reducing sections shown, representing valve components which are basic to the operation of the valve. Optional, non-standard components shown in FIG. 1 and FIG. 2 are vent valve 17 and seal 20 separating pressure reducing section 10 from valve operating section 12, and their function will be defined when discussing individual figures identifying different valve positions in a greater detail.

From FIG. 1 and FIG. 3 we see that fluid is restricted to flow through the valve by sealing elements such as indicated by edge 24 wedged against a first sealing ring 18 permanently secured to inside surface of bore 6 while a first baffle 4-a is permanently secured to member 5 of FIG. 1 and along with a second baffle 4-b secured to bore 6 inside, with inside edge of small diameter orifice 23 wedged against a second ring 19 secured to member 5 while baffle outside is secured to bore 6 inside, including outside edge of a third baffle 4-c secured to member 5 and sealed against a third ring 18-a secured to bore 6 inside, and so on with up to 200 of such baffles to satisfy large pressure drop and huge flow requirements while minimum may be only 2 baffles alternatingly secured each to either bore 6 inside or member 5. In FIG. 3 baffles are arranged so that the second baffle 4-b of FIG. 1 is secured by the outer large diameter edge to inside wall of bore 6 first, leaving smaller diameter inner orifice 23-a open to fluid flow and adaptable to be closed by a first ring 19-a of semi-circular configuration similar to second ring 19 of FIG. 1 both permanently secured to tubular member 5. Further advantages of the arrangement of conical baffles in design and operation the pressure reducing valve section 10 of FIG. 3 offers will become more fully apparent from the ensuing discussion of FIGS. 1 and 2 which show valve otherwise identical in operation and design to that shown in FIG. 3. Referring back to FIG. 1 we find that seal 20 inside groove of short nozzle 21 separates valve operating section 12 from pressure reducing valve section 10 communicating normally via opening 22 which is closed by a slidably movable upper end 5-a of tubular member 5 of valving assembly 3, enabling fluid under pressure entering port 9 to exert a force over large baffle surface exposed thereto developing an end thrust larger than the opposing force of biasing spring 15, that maintained valve closed, thereby forcing valving assembly 3, comprising valving means of this throttle valve, to change positions from a first valve closed position shown in FIG. 1 to that shown in FIG. 2 identifying valve open second position with flow reversals causing large pressure drop until and unless fluid supply to port 9 is stopped rendering valve automatically closed by spring 15. It should be noted that spring operated valve as described above is only good for applications where force and fluid modulation is unnecessary. However, it was determined that in practice neither flows nor pressures are always exact, and that better results could be obtained by allowing fluid under pressure help in valve operation which was possible by removing seal 20 from nozzle 21 and closing vent 13 by valve 17, clearly shown in FIGS. 1 and 2.

In FIG. 1 with valve 17 in use, high pressure fluid not only enters pressure reducing valve section 10 but also valve operating section 12 enabling the use of novel valve operating means whereby fluid under pressure exerts a force over piston underside of a variable magnitude due to control ability valve 17 provides therein. When valve 17 is fully closed, biasing force piston 16 exerts is larger in the upward direction forcing valve into first valve closed position with or without the spring, eventhough if spring 15 is used, piston diameter of piston 16 may be somewhat smaller than the outside diameter of baffles 4-a and 4-c, except in case of FIG. 3 wherein the first ring 19-a when subjected to the same fluid pressure will exert considerably smaller end thrust, facilitating valve operation with somewhat smaller piston 16 adequately. However, if valve 17 is open partially or fully, downward end thrust(force) over the baffle surface of FIG. 1 and FIG. 2 design and also over seal ring 19-a of FIG. 3 design will prevail rendering this pressure letdown valve partially or fully open, depending on the amount of pressurized fluid escaping cavity 14, and the magnitude of pressure prevailing therein. In any event, maintaining valve 17 partially open would allow pressure and flow modulation inside pressure reducing valve section 10 shown in FIGS. 1, 2 and 3, with resultant pressure drop when flow through the valve is allowed to proceed in accordance with fluid passages identified in FIG. 2 in detail. It is to note that in practice, vented fluid from cavity 14 is returned to the low pressure side of the system, somewhere downstream of the valve by way of appropriate interconnecting fluid conduit (not shown), therefore nothing is wasted by incorporating high pressure fluid subject to pressure reduction for valve operation in accordance with the discussion above. Also, as can be seen from FIG. 2 identifying valve open, fluid passing the pressure reducing valve section 10 undergoes severe punishment due to tortureous passages with multitude of pressure reversals accompanied by alternatingly occuring self-limiting fluid expansion and contraction processes when forced to cross large diameter edges of baffles, such as shown by 24 of one baffle of FIG. 1 design, first before it is subsequently subjected to a drastic contraction in another baffle shown in FIG. 2 or initiating with such drastic reduction of flow when passing annular opening 23-a closed by ring 19-a of FIG. 3 first before it is redirected toward large baffle edge 24 of another baffle spaced adjacent to it until all baffles provided therein as shown in FIG. 1 and FIG. 3 are crossed resulting in large pressure drop due to energy loss fluid experiences while crossing this pressure throttling letdown valve.

By reference to FIG. 1 and FIG. 3 it can be deduced that the degree of flow reversal and the net free area, shown clearly by 25 in FIG. 2, controlling pressure drop can be varied in accordance with requirements by increased number of baffles in both designs. It should be understood that the designs shown in FIG. 1 and FIG. 3 include only three conical baffles, rendering very limited amount of pressure drop to fluid flowed due to larger than possible distance between such baffles yielding rather large net free area thereby representing merely the conceptual parameters set forth herein by way of example of most clearly defining invention without redundance in drawings and in description.

In practice, baffles will be much closer together for increased pressure drop, increasing considerably the wetting surfaces that induce friction to flow therebetween and augmenting effects of reversals due to reversal degree baffles spaced closer induce including decreased net free area to comply with any process specification baffle arrangment of FIG. 1 or FIG. 3 provides. From FIG. 2 it is, however, obvious that when valve is in second open position, baffles that are securely attached to the tubular member 5 move downward against stationary baffles secured to inside bore 6, and that for each stationary baffle there is an adjacent moving companion baffle, i.e. if the first conical baffle is stationary than the second baffle is axially movable towards adjacently located third baffle, and conversally if the first conical baffle is movable, than the second is stationary while the third is movable, and so on. This in effect dictates fluid expansion over outside large diameter edges of moving baffles and fluid contraction when it is forced through the annulus shown between central member 5 and small diameter orifice 23 of FIG. 1 and 23-a of FIG. 3. Because of induced immediate fluid turning between closely spaced adjacent baffles be it stationary or moving, the effect of expansion is eliminated by overriding effect of fluid contraction: with subsequent flow reversal sometimes more than 180 degrees, expansion coupled with said contraction comprising totally up to 10 velocity head pressure drop. Obviously, concept outlined will work if baffles were attached to bore 6 or tubular member 5 in a reversed fashion, and/or if rings 18 or 19 were replaced by other sealing or pressure inducing elements such as disks, torus, U-cups or collars or the like. In fact, ring 18 may be eliminated along with ring 19 from the system completely without adverse effect to the valve operation since ring 18-a could provide ample sealing, in particular if seal 20 were eliminated from nozzle 21 allowing fluid help operate subject valve as per preceding discussions of FIG. 1. Likewise discussion of valve operating section of FIG. 3 is identical to that of FIG. 1, and it is totally immaterial for pressure reducing valve section of FIG. 2 what type of operating means in said valve operating section are used for control of valving means, be it compensated by biasing spring 15 alone at which time seal 20 along with valveless vent 13 is used only, or by biasing force means fluid under pressure develops inside cavity 14 exerting upward end thrust to maintain valve closed at which time seal 20 is eliminated and vent 13 is provided with control valve 17 to insure valve position change and simultaneous valving of high pressure fluid with pressure reduction for exhaust at substantially lower fluid pressure. As stated before, however, the use of fluid for valve operation in cavity 14 alone or in combination with spring 15 is much more attractive due to the ability to provide flow and pressure modulation allowing practically infinite setting of valving means inside pressure reducing valve section with finite control of fluid flow through the valve of present invention, unattainable by valve designs of prior art that may exist.

Likewise, switching baffles by reversing positions thereof in accordance with FIG. 3 provides design flexibility to cope with unlimited applicational requirements no valves of prior art entail, thereby satisfying the objectives set forth in this invention.

Although a preferred embodiment of this invention is hereby disclosed, it is to be understood that various modifications and rearrangements of parts may be resorted to beyond those already identified without departing from the scope of the invention disclosed and claimed herein.

What is claimed is:

1. A throttle valve for pressure letdown comprising: a pressure reducing valve section and a valve operating section, including means for interconnecting said first with said second valve sections in an operable relationship therebetween so as to enable a simultaneous pressure reducing while valving high pressure fluid therethrough in a torturous pathway with large pressure reduction and exhaust at substantially lower fluid pressures, said pressure reducing valve section including a valving means comprising an elongated valve housing with a first bore passing therethrough open to serve as low pressure fluid exhaust port means and a second smaller coaxial bore adjacent said second valve operating section and interconnecting said first and second valve sections, a central stem of a valving assembly housed inside said pressure reducing valve section and slidably received in said second bore and including operating means for operating said valving means, said valving assembly being disposed centrally in essentially coaxial elongated relationship with said first and second bores, a side port entering perpendicularly through a housing wall and communicating with said first bore, said valving assembly further including a plurality of conical baffles attached to said first bore and said stem, alternately, said alternately attached baffles respectively sealing on said bore and said stem when said valving means is closed and spaced along the axial length of said central stem between said fluid side port and said first bore so as to provide an alternating valve and baffle flow structure with a multitude of flow reversals accompanied by alternatingly occurring flow directional changes.

2. A throttle valve as in claim 1 wherein said operating means for said valving means in said valve operating section includes a biasing force means capable of maintaining said valving means in a first valve closed position when a high pressure fluid supply to said pressure reducing section is stopped, said biasing force means acting upwardly exerting a biasing force considerably smaller than an opposing downward end thrust high pressure fluid exerts over a large surface area of said baffles for automatic valve opening when a high pressure fluid supply is communicated to said first bore through said side port forcing said valving means to assume a second valve fully open position automatically, said operating means capable of maintaining said valving means in normally closed position when said high pressure fluid supply to the valve is no longer communicated to said fluid supply port means.

3. A throttle valve as in claim 1 wherein said operating means of said valving means in said valve operating section includes a variable biasing force means, wherein when said biasing force acting upwardly is larger than an opposing downward end thrust high pressure fluid exerts over a large surface area of said baffles, said valving means assumes a first valve closed position, rendering valving means completely shut, and when said biasing force acting upwardly is smaller than said opposing downward end thrust high pressure fluid exerts over said large surface area of said baffles, said valving means assume a second valve open position, rendering valving means fully open, a position control means in said valve operating section, including means for varying said biasing force means to enable said valving means to assume an infinite number of positions between said first valve completely closed and said second fully open positions.

4. A throttle valve as in claim 1 wherein said valve operating section includes a housing extension atop of said pressure reducing valve section, said housing extension secured permanently thereto in a concentric coaxial relationship with said housing bores to comprise a part of said elongated valve housing having a third bore opposite said first bore and adaptable to be closed by a piston slidably received therein and forming a fluid cavity between a first piston side and said second bore said fluid cavity comprising an integral part of said second valve operating section of said pressure letdown throttle valve, said piston permanently secured to said first end of said central stem of said valving assembly comprising an integral part thereof and together with said valving assembly is axially movable inside said pressure reducing and said valve operating sections in said operable relationship therebetween and including said operating means for operating said valving means from a first valve closed to a second valve open positions and including a venting means for said fluid cavity, wherein said venting means modulates the fluid pressure within said fluid cavity to vary the biasing force opposing fluid pressure through said fluid supply port means acting on a surface area of said baffles.

5. A throttle valve as in claim 1 wherein said plurality of said conical baffles of said valving assembly alternately spaced along the length of said central stem includes a first and a third of said conical baffles permanently secured by inside diameter to an outside diameter of said central stem while each second conical baffle is permamnently secured by outside diameter thereof to the inside diameter of said bore of said elongated valve housing, said central stem with said baffles movable axially within said pressure reducing valve section, and when said valving means is maintained open, fluid entering said valve via said side port is directed to flow along the outside diameter of said first and said third conical baffles prior to changing directions for passing internally inside reduced diameter of said second conical baffle when crossing said plurality of said conical baffles.

6. A throttle valve as in claim 1 wherein said plurality of said conical baffles of said valving assembly includes a first and a third of said baffles permanently secured by outside diameter thereof to the inside diameter of said bore of said elongated valve housing while each second baffle is secured permanently by inside diameter thereof to an outside diameter of said central stem which moves axially therein and when said valve is open, fluid entering said valve via said side port is directed to flow through a largely reduced annulus formed between small inside diameter of said first and third conical baffles and said central stem of said valving assembly.

* * * * *